(12) United States Patent
Pattabiraman et al.

(10) Patent No.: US 7,949,841 B2
(45) Date of Patent: May 24, 2011

(54) PROTECTION OF CRITICAL MEMORY USING REPLICATION

(75) Inventors: Karthik Pattabiraman, Urbana, IL (US); Vinod K. Grover, Mercer Island, WA (US); Benjamin G. Zorn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/608,695

(22) Filed: Dec. 8, 2006

(65) Prior Publication Data

US 2008/0140962 A1    Jun. 12, 2008

(51) Int. Cl.
G06F 12/00 (2006.01)
G06F 13/00 (2006.01)
G06F 13/28 (2006.01)

(52) U.S. Cl. ........... 711/162; 711/E12.002; 711/E12.04; 714/2; 714/6; 714/797

(58) Field of Classification Search .................. 711/162; 714/2, 6, 797
See application file for complete search history.

(56) References Cited

U.S. PATENT DOCUMENTS

| | | | |
|---|---|---|---|
| 3,742,458 A | | 6/1973 | Inoue et al. |
| 4,177,510 A | | 12/1979 | Appell et al. |
| 4,388,695 A | | 6/1983 | Heinemann |
| 4,937,736 A | | 6/1990 | Chang et al. |
| 4,975,878 A | | 12/1990 | Boddu et al. |
| 5,559,992 A | | 9/1996 | Stutz et al. |
| 5,564,011 A | * | 10/1996 | Yammine et al. ............ 714/15 |
| 5,742,792 A | * | 4/1998 | Yanai et al. .................. 711/162 |
| 5,867,655 A | | 2/1999 | DeRoo et al. |
| 5,964,835 A | | 10/1999 | Fowler et al. |
| 5,987,566 A | * | 11/1999 | Vishlitzky et al. ............ 711/114 |
| 6,141,770 A | * | 10/2000 | Fuchs et al. .................... 714/11 |
| 6,397,293 B2 | * | 5/2002 | Shrader et al. ................ 711/114 |
| 6,408,373 B2 | | 6/2002 | Burger et al. |
| 6,505,307 B1 | * | 1/2003 | Stell et al. ....................... 714/6 |
| 6,629,110 B2 | * | 9/2003 | Cane et al. ..................... 707/204 |
| 6,636,971 B1 | | 10/2003 | Loukianov |
| 6,718,274 B2 | | 4/2004 | Huang et al. |
| 2003/0115403 A1 | * | 6/2003 | Bouchard et al. ................ 711/5 |

OTHER PUBLICATIONS

Webopedia, "API" and "Checksum", Sep. 1, 1997 and Oct. 30, 2001, pp. 1-6 http://www.webopedia.com/TERM/A/API.html http://www.webopedia.com/TERM/C/checksum.html.*
Karthik Pattabiraman et al., Samurai—Protecting Critical Heap Data in Unsafe Languages, Jun. 28, 2006 (18 pages).
Mondrian Memory Protection http://www.cag.csail.mit.edu/scale/papers/mmp-asplos2002.pdf.
Implementing Basic Memory Protection in VxWorks: A Best Practices Guide http://www.windriver.com/whitepapers/wp_vxworks_vxvmi.pdf.

* cited by examiner

Primary Examiner — Matt Kim
Assistant Examiner — Christopher D Birkhimer
(74) Attorney, Agent, or Firm — Workman Nydegger

(57) ABSTRACT

Typical computer programs may incur costly memory errors that result in corrupted data. A new memory model is presented wherein it may be determined that certain data is critical and critical data may be stored and protected during computer application execution. Critical Memory allows that data determined to be critical may be stored and retrieved using functions enabled to increase the reliability of the data. Functions are presented enabling allocation of redundant computer memory; functions are presented enabling consistently writing critical data to redundant locations; and functions are presented enabling reading critical data while ensuring that the data read is consistent with the most recent write of critical data and enabled to repair inconsistent data. The memory model and functions presented are designed to be compatible with existing third-party libraries.

18 Claims, 4 Drawing Sheets

PROTECTION OF CRITICAL MEMORY USING REPLICATION

CROSS-REFERENCE TO RELATED APPLICATIONS

None

BACKGROUND

Background and Relevant Art

Computer programs are ubiquitous and are used not just to direct the functionality of a conventional computer but also to control and enhance the functionality of myriad modern products and appliances. For instance, televisions, household appliances, automobiles, medical devices, and so forth, may incorporate computer programs to direct their functionality. Proper storing, reading, writing, and manipulation of data are inherent to the execution of computer programs. That the data written or stored is not corrupted or inadvertently altered prior to a subsequent read access is something which is assumed by executing software and, if otherwise, may cause executing software to fail to complete successfully or to execute or complete while producing an erroneous or suspect result.

Current computer memory models treat all data in an address space as functionally equivalent, even though, in practice, some data may be far more important than others in the successful or correct execution of a particular computer program. Memory may be written and read, for instance, by entities such as application programs, by functions and subroutines within an application program, and by third-party libraries called by application programs. There is often little or no protection or verification that the data being written or read by any of these particular entities is correct or that it is being written to or read from the correct memory location. Because one entity may be relying on data that may or may not be overwritten or otherwise altered or corrupted by another entity, there is a danger that erroneous, inadvertently altered, or corrupted data may adversely affect the proper and correct execution of a computer program.

In type safe programming languages like Pascal and Java, only an entity which knows what type of data it is accessing may read from or write to the data location. Although this may insure that only the proper type of data is being written or read, it in no way guarantees that the values being written or read are safe. Furthermore, even type-safe languages cannot protect against corruption of pointers or handles to memory locations or corruption, such as through hardware errors, to the data within the memory locations, themselves.

Computer programming languages such as C, C++, and others do not typically provide even the level of intrinsic guarantees about memory safety which are present in type-safe languages such as Java. Many applications are still written using these languages for performance and compatibility reasons and, as a result, memory errors continue to be common causes of both program failures and security vulnerabilities. In a typical C or C++ program, for example, it is possible for an erroneous pointer or memory read or write to cause the application to terminate abnormally (i.e., "crash") or to produce incorrect output or results.

Beyond the corruption due to inadvertently erroneous reads and writes, hardware errors may also introduce possible errors to otherwise correctly executing software. Even an otherwise correctly written program calling only correctly written subroutines or libraries may suffer ill effects if a memory location, itself, is somehow corrupted or its value inadvertently changed.

Because of the sometimes unreliable nature of data stored in computer memory and the inherent reliance of software on all data being perfectly reliable, computer software continues to be plagued with problems of reliable execution and production of reliable results.

BRIEF SUMMARY

A new approach is provided for providing memory safety to applications written in computer languages which may or may not provide adequate safety measures. The approach is taken that some data—critical data—may be more important than other data, and that critical data requires stronger consistency guarantees than other, non-critical, data For example, in a banking application, individual account information may be more important than the view data used to populate a user interface.

As illustrative but not restrictive, and although not required, embodiments of the present invention relate to the protection of critical data and critical memory variables within a software application. The present invention relates to the designation of certain program data as critical data and certain computer memory as critical memory and embodiments allowing for certain critical operations on critical memory which will ensure that all data written to and read from critical memory is consistent and free from errors, corruption and inadvertent updates.

An example embodiment is provided which provides for allocation of redundant storage for critical data. Data stored to critical memory using critical stores is written to the redundant locations. Critical data, when read using a critical load, is compared within the redundant storage locations to determine if errors may be present. If errors are present, then a majority voting scheme is employed to facilitate repair of the compromised data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention relate to Critical Memory (CM). CM modifies a typical, flat, computer memory model and CM recognizes that certain data may be critical to correct program execution but that not necessarily all data within a computer program context is critical to correct program execution. CM allows certain data to be marked as critical and allows for a distinction between critical and non-critical data. The embodiments of the present invention may comprise, but are not limited to, a special purpose or general-purpose computer including various computer hardware, as discussed in greater detail below, as well as methods, systems, computer-executable instructions, and computer program product embodiments.

Figure 1:
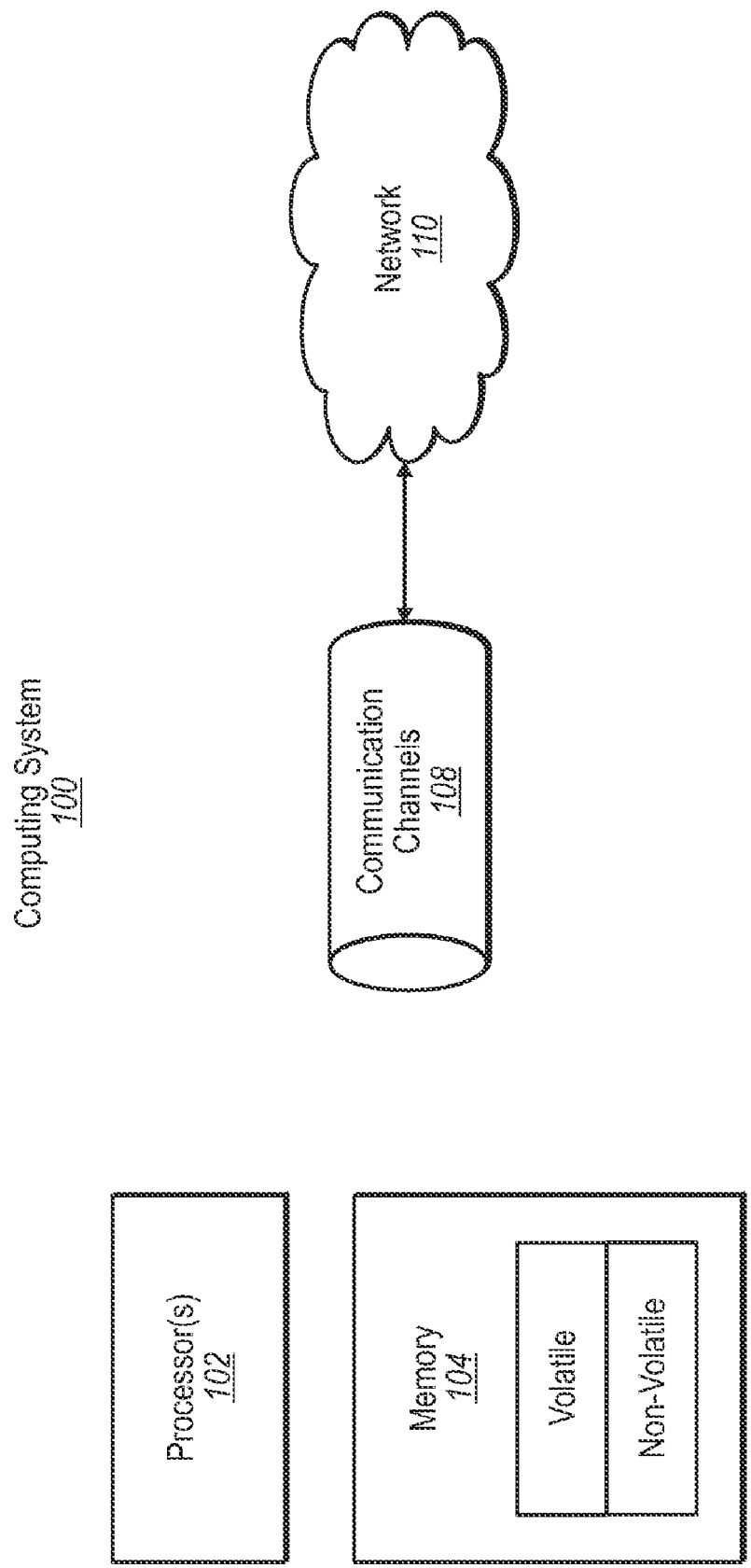
FIG. 1 illustrates a computing system in which embodiments of the principles of the present invention may operate.

FIG. 1 shows a schematic diagram of an exemplary computing system 100 that may be used to implement embodiments of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Critical Memory

Critical Memory (CM) is a modification to a typical flat memory model and CM recognizes that certain data, but not necessarily all, are critical to correct program execution. Critical data may be defined to be a subset of data that which may be necessary for continued operation of an application in the presence of errors. Alternatively, critical data may be defined as a subset of an application's data whose consistency has been determined to be crucial to preserve in order to recover the application successfully after a failure. Critical data may be defined as the data an application programmer has determined is most important to preserve during execution of a particular application or process. An embodiment of CM allows that data and memory critical to the execution of a computer program may be identified and may then be protected from being corrupted by erroneous program stores or by other inadvertent corruption through hardware errors or errant behavior of function calls, library calls or action by third-party software. The concept of critical memory is introduced. Critical memory is memory which has been determined—by a programmer, by an automated system, or by other means—to be critical to the execution of a particular computer program.

CM may be used in applications where memory locations might become corrupted, either through unsafe program operations, possible race conditions, hardware transient faults, and so forth. CM, by its nature and by its design, is consistent and compatible with large bodies of existing computer programming code. CM has been designed to operate compatibly with existing computer programming code without the necessity of modifying the already existing code.

An important application of CM is to improve program reliability. Systems built upon CM may be used to recover from memory errors and hardware transient errors. CM may be used to provide systematic assurances that unwanted memory interactions between concurrent threads are not possible. CM may be used with Software Transactional Memory (STM), as is known to those skilled in the art, to provide additional safety and assurance of correct program execution. Proposed implementations of STM provide weak atomicity semantics—they do not guarantee the result of an atomic section is consistent if the data being updated in the section is also being modified elsewhere outside an atomic section. CM can be used to decrease the probability that incorrect threads writing to shared data outside an atomic section modify that data while a transaction is taking place. CM may be used alone or may be used in combination with STM to provide an optimistic concurrency implementation with lower probability of atomicity violations. CM has been designed to, when utilized, probabilistically tolerate errors caused by errant threads within computer software execution.

Computer software applications with built-in state-saving and error recovery mechanisms can recover from a broad range of software faults more often than applications that use generic techniques such as system-level checkpointing. Such recovery mechanisms are typically written by the programmer who makes assumptions about the consistency of the state saved by the application for recovery. CM formalizes the notions of critical data, and the state-saving, consistency-checking, and error recovery, above.

One particular embodiment of CM introduces the operations map_critical, unmap_critical, and promote. The map_critical operation may be used to designate specific memory as containing critical data. The unmap_critical operation may be used to designate specific memory, which had previously been designated as containing critical data, to be memory the contents of which does not contain critical data. The promote operation both maps a memory address as critical and promotes the contents of that address, whatever they are at the time the promote operation is invoked, to be critical.

The map_critical operation may be used to mark a memory address used in a program as critical. This places the data in the memory address under the protection of CM and guarantees that the data is safe from unintended modification, provided it is accessed according to the rules as provided by CM.

In one particular embodiment, two new memory operations are added to typical computer memory management models, critical_load and critical_store. Critical_load and critical_store are operations which are allowed to consistently read and modify, respectively, critical memory. No other program operations can modify the contents of critical memory with respect to subsequent critical_loads.

A Summary of the operations defined in one embodiment of Critical Memory (CM) are summarized in Table 1.

TABLE 1

Summary of an Embodiment of CM Operations

| Name of Operation | Arguments | Semantics |
|---|---|---|
| map_critical | Address | Marks an address as critical and clears its contents. |
| unmap_critical | Address | Marks an address as non-critical, and preserves its contents. |
| critical_load | Address, Register | Does a critical load of the address contents into the register |
| critical_store | Address, Register | Does a critical store of the register contents to the address |
| promote | Address | Marks an address as critical and preserves its contents. |

A critical_load is defined as an operation that could potentially read from critical data and is allowed by the semantics of the program to do so. A critical_store is defined as a static instruction that could potentially write to critical data and is allowed by the semantics of the program to do so. CM guarantees that any update made to critical data through a critical_store will correctly update the critical data, and any update made to the critical data through a normal store will not be able to update the critical data (in a consistent way). Any read of the critical data done through a critical_load will see a consistent version of the data (whereas any read of the critical data done through a non-critical_load may or may not see a consistent version. By consistent, it is meant that a critical_load to a critical memory location will read the value written by the last critical_store in the program to the critical memory location. CM ensures that any intervening updates to the critical data by non-critical stores will be transparent to the critical_load.

In one embodiment, a critical_load conveys the intent—by the programmer or otherwise—to read from critical data and is allowed by the semantics of a valid program to do so. A critical_store conveys the intent—by the programmer, by an automated system, or otherwise—to write to critical data and is allowed by the semantics of a valid program to do so. While a majority of a software application may not be type-safe, CM ensures that the subset of the program (for example, a class, function, or module) that uses critical_loads and critical_stores can be statically checked for correctness independent of the operations performed by the rest of the application and its libraries. Any code which violates memory safety should not be allowed to perform critical_stores and hence would not be able to overwrite the critical data. CM allows a programmer to preserve the consistency of critical data even in the presence of arbitrary unsafe code.

Guarantees of CM extend only to the critical data. CM does not provide any guarantees to the non-critical data. In a program, the same instruction may access both critical data and non-critical data depending on the program context and execution flow. It is necessary to mark any load or store that may access critical data as a critical_load or critical_store. When non-critical data is accessed by a critical_load or a critical_store, the effect of the operation is similar to an non-critical load or non-critical store on the non-critical data. An non-critical_load is allowed to read from critical data, but the degree of consistency of the data read by such an non-critical load would be defined by the particular implementation of CM.

The semantics of CM with respect to critical_loads and non-critical_loads and critical_stores and non-critical stores are summarized in Table 2.

TABLE 2

Interactions between CM loads and stores

| Type of Operation | Data being Accessed | Guarantees provided by CM |
|---|---|---|
| critical_load | Critical Data | Guarantees that the value read is the one written to by the last critical-store to this location. |
| critical_store | Critical Data | Guarantees that the update is reflected in the critical data and is visible to future critical loads on the critical data. |
| critical_load | Non-Critical Data | This is equivalent to an non-critical-load on the non-critical data. |
| critical_store | Non-Critical Data | This is equivalent to an non-critical-store on the non-critical data |
| non-critical load | Critical Data | The value read by the load depends on the compatibility model of the particular embodiment |
| non-critical store | Critical Data | The effect of the update is not reflected in the critical data and future critical loads will not see this update. |
| non-critical store | Non-Critical Data | This updates the non-critical data similar to a regular store in a program. |
| non-critical load | Non-Critical Data | This reads from the non-critical data similar to a regular load in a program. |

As implemented in one embodiment, once a critical address has been unmapped using the unmap_critical operation, it can be accessed using normal loads and stores and critical_loads and critical_stores to that address have the same effect as normal loads and stores. Memory addresses may be unmapped, for example, when the programmer is finished using the memory region and de-allocates it (e.g., by using a free ( ) operation).

Reference Interleaving

In one particular embodiment, CM may be used by an application to protect critical data despite potential unsafe operations performed in third-party library code or in external function calls. CM may be implemented within an application that calls a library that has no knowledge of CM. CM may be implemented over a spectrum of choices concerning the semantics which constrain the CM implementation and which provide varying degrees of compatibility with non-CM aware libraries. By way of example, three degrees of compatibility are illustrated which may be implemented in particular embodiments of the present invention (but should not be considered to limit the scope of the present invention).

In the example, three illustrative degrees of compatibility may be termed Weak, Strong, and Extreme compatibility. Table 3 illustrates the results of loads and stores given the three illustrative degrees of compatibility.

TABLE 3

Compatibility Interleaving Semantics

| Interleaved Instruction Sequence | Weak Compatibility | Strong Compatibility | Extreme Compatibility |
|---|---|---|---|
| map_critical x | | | |
| critical_store 5 -> x | | | |
| load x | x = 5 | x = 5 | x = 5 |
| store 6 -> x | | | |
| load x | x = undefined | x = 6 | x = 6 |
| critical_load x | x = 5 | x = 5 | x = 5 |
| load x | x = 5 | x = 5 | x = 6 |

The first column in Table 3 illustrates a sequence of interleaved memory operations. The remaining three columns show the value of the variable x assuming which of the three different degrees of compatibility is employed within the particular embodiment. After the memory location x has been marked as critical by the map_critical operation, and after the first critical_store of the value 5 into the location x, then, under each of the three degrees of compatibility, the value of x, when read by a load x, is 5. The differences in the degrees of compatibility are illustrated by the results after a subsequent normal store (i.e., not a critical_store) of the value 6 into the location x.

Under weak compatibility, there are no guarantees about the effects of non-critical stores to critical memory locations. As a result, after the non-critical store of 6 into location x, an non-critical load from the location x will produce undefined results. However, a critical_load from the location x will produce the value last stored by a critical_store which, in this case, is the value 5. After the critical_load from the location x, then the value of the location x has been guaranteed to be correct and consistent so, absent any intervening non-critical stores, then each subsequent load will also result in the value 5.

Under strong compatibility, a subsequent non-critical load from an address will result in the value stored by the previous non-critical store provided that an intervening critical_load has not restored the value or an intervening critical_store has not changed the value. In this case, the non-critical load from the address x will result in 6, the value stored by the preceding non-critical store (without an intervening critical_load or critical_store). Subsequent critical_loads, however, will result in the value 5 being returned—the value written by the previous critical_store. With the strong compatibility approach, third-party libraries will be able to modify critical data as if it were normal memory, but the effects of updates by the third-party libraries using non-critical stores will not be visible to subsequent critical_loads in the application.

Under extreme compatibility, loads from and stores to critical addresses are completely independent of critical_loads and critical_stores to the same addresses. An non-critical load from an address results in the value placed in the address by the last non-critical store to that address. A critical_load from a critical address results (as always) in the value stored in the address by the last critical_store. Under extreme compatibility, a critical_load will not restore the value stored by a critical_store for subsequent non-critical loads. Extreme compatibility can be used, for instance, in systems wherein called library functions perform call-backs into an application which contains critical_stores or critical_loads and it is desired that the stored data remain consistent within the library function.

CM and Libraries

An application employing CM may, in some instances, call library code which is potentially unsafe and which is not aware of an CM implementation or CM semantics. Library code is not CM-aware if it does not allocate critical data or perform critical_loads or critical_stores. In a case where the library code does not need to modify critical data, the library code can execute as it was written and the loads and stores the library code does to non-critical data occur as if CM was not being used. If library code performs non-critical loads from critical addresses, then the values read will be consistent with the values written to the addresses by the CM-aware main application prior to calling the library.

If a library is required to modify critical data, then, as in some embodiments, additional actions are necessary. An example is illustrated by the following code:

```
map_critical x
critical_store 5 -> x
...
unmap_critical x
call library foo
promote x
```

In this example, the address x is unmapped before calling the library foo, allowing the non-critical stores in the library to update the address in a way that will be visible to the main program. After the call, the address x is promoted, which simultaneously makes the address x critical again and makes the current value—as stored by (the possibly CM-unaware) library foo—the critical value.

While the above example assumes a library which is not CM-aware, in some embodiments, libraries may also be written using their own CM critical memory. This would lead to the issue of interfering critical memory updates between a library and the application. An approach in one particular embodiment would be to associate a unique key with each compilation unit (i.e., library or application) and tie each static critical memory operation in a unit to the unit's unique key. In this case, critical memory that is mapped with one key could only be updated with a critical_store that had the same key associated with it.

By following the above approaches, embodiments of CM allow incorrect library functions which have memory errors to continue execution and see a consistent view of memory (by using strong or extreme compatibility semantics). In these embodiments, CM guarantees that the critical data of the application is not impacted by the memory errors introduced by library functions as long as the library does not perform verfied_stores to the application's critical data.

Local Immutability

In some embodiments, CM may also be used to provide local immutability of data. For example, a program which is about to open a file for update might check to see if the file is in a particular scratch directory to limit the effect the update can have on the rest of the file system. A security exploit of this action involves a race condition whereby the string that was checked is updated by another thread between the time of the check, and the time the file is actually opened. If the string were truly immutable, then the subsequent update would be impossible, and the problem is solved. CM may be employed to accomplish this effect by doing a map_critical of the memory locations before the check, using a critical_load when the operation is performed, and doing an unmap_critical after the operation. When this procedure is followed, non-critical updates to these locations in the time between the check and the operation are ignored by the critical load.

By the above procedure, CM can provide the functionality of local immutability, which can be appreciated by those skilled in the art, is an element which can enhance the guarantees provided by Software Transactional Memory ("STM"). It may be appreciated that CM may be employed in this fashion to ensure local immutability independently of STM and may also be used in conjunction with STM as CM adds additional and orthogonal functionality.

Optimization Opportunities using CM

In certain embodiments, CM may provide opportunities for enhanced performance through optimizations made possible by CM. One such opportunity is based on the observation that critical_loads and critical_stores will generally, but not necessarily, form a small subset of all loads and stores within a typical software application. If the particular embodiment employees weak compatibility semantics, as discussed above, critical_loads and critical_stores can be repositioned independently relative to other loads and stores in the software application. For example, in the code sequence:

```
critical_store 5 -> x
loop:
    <no critical operations>
    store 100 -> y
    store 500 -> z
    critical_load x
    goto loop
```

The critical_load of x can be moved out of the loop because the intervening loads and stores are guaranteed not to change the value of x. This would result in the following code sequence which reduces the computation overhead of performing the critical_load x each time through the loop:

```
critical_store 5 -> x
critical_load x
loop:
    <no critical operations>
    store 100 -> y
    store 500 -> z
    goto loop
```

Because the results of critical_loads and critical_stores are unaffected by other normal loads and stores, they may form a well-typed and statically checkable independent subset of the computation being performed by the rest of the software program. As a result, the optimizer can more aggressively reorder critical operations and normal operations because it knows that they are independent.

A second optimization of CM is possible in another embodiment. CM introduces the ability to reason locally about critical values. When addresses are mapped as critical and local to a component, then an optimizer is guaranteed that other components, even when executing in the same address space, cannot modify the critical addresses unless they are specifically allowed to do so. As such, use of critical memory as taught by CM may provide data-centric guarantees of isolation even within the same address space.

In certain embodiments, CM may be considered to be an embedding of a smaller, simpler, well-typed program—operating only on critical data—within another, larger, program. The simpler critical data program provides the optimizer additional opportunities for optimization over the original program which, when written in C or C++, as those skilled in the art are aware, often contain aliases that confound attempts at static analysis critical for optimization.

Improving Atomicity Semantics with CM

In certain embodiments, CM may be used in conjunction with transactional memory to provide probabilistic isolation guarantees to transactional memory implementations which, by their nature, provide only weak atomicity. Many transactional memory implementations use optimistic concurrency control for transactional reads and write-in-place semantics in order to achieve high-performance. However, transactional memory provides weak atomicity in order to achieve this high-performance.

In particular embodiments, CM may be used with software transactional memory (STM) schemes to provide a low-overhead method for decreasing the probability that conflicting memory operations will violate the atomicity of the STM implementation. CM may be used to temporarily hide effects of updates to memory from other threads during the execution of an atomic section. CM critical_load and critical_store operations may be paired with complimentary STM operations. For each memory location which is modified in an atomic section, STM can provide support for conflict detection and undo, while the CM system can independently provide for resilience to external modification outside the thread.

The code sample "a" (which is written in a C-like pseudo-code), below, shows a simple example of STM code which atomically accumulates a local value, localSum, into a shared variable, Total->Sum.

a) Original STM Program

```
// Total is a struct containing a global integer, Sum,
// and is shared
while (element = iter->get( ) ) {
    localSum = element->value( );
    atomic {
        Total->Sum += localSum;
    }
}
```

The code sample "b", below, shows the pseudo-code corresponding to the code, above, with STM primitives exposed. In this example, C++ exception handling is used to encapsulate the body of the atomic block. A runtime primitive TxStart creates a new transaction container. Accesses to the shared variables are done via runtime primitives, TxRead and TxWrite. The TxCommit primitive is called at the end of the atomic block to complete the transaction. If the transaction state is valid and there is no conflict with another transaction, the effects of the transaction are published to shared memory. Otherwise, an internal exception, TxError, is raised. The handler for this exception, in the event of the exception, rolls back the transaction state and re-executes the transaction body.

b) STM Program with Primitives Exposed

```
while ( element = iter->get( ) )
{
    localSum = element->value( );
    void * Tx = TxStart( );
    RestartLabel:
    try
    {
        TxRead(&Total->Sum);
        tmp = Total->Sum;
        tmp = tmp + localSum;
        TxWrite (&Total->Sum);
        Total->Sum = tmp;
        TxCommit( );
    }
    catch (TxError * errorCode)
    {
        TxRollback(errorCode, Tx);
        goto RestartLabel;
    }
}
```

CM is integrated with STM in the code, above, in order to prevent a third thread which does not follow the transaction protocol from writing to the shared variable Total, outside the atomic section and corrupting it. An example of such use of CM as integrated with STM is shown in code sample "c", below. CM is used to restore the contents of the Total variable to its contents within the atomic section. Calls to critical_store and critical_load operations are inserted within the atomic section along with the TxRead and TxWrite operations. These critical operations will ensure that the value of the Total variable is unlikely to be updated outside the atomic section.

c) STM/CM Program with Primitives Exposed

```
while ( element = iter->get( ) )
{
    localSum = element->value( );
    void * Tx = TxStart( );
    RestartLabel:
    try {
        critical_load(&Total->Sum);
        TxRead(&Total->Sum);
        tmp = Total->Sum;
        tmp = tmp + localSum;
        TxWrite(&Total->Sum);
        Total->Sum = tmp;
        critical_store(&Total->Sum, tmp);
        TxCommit( );
    }
    catch (TxError * errorCode)
    {
        TxRollback(errorCode, Tx);
        goto RestartLabel;
    }
}
```

As can be appreciated, in code sample "c", above, the critical_load call does not actually perform the load, but it verifies that the data value loaded by the TxRead is consistent and has not been corrupted. The CM critical_load is inserted just before the STM TxRead to ensure that the value read by the STM library function is consistent with the value observed by the CM implementation. Similarly, the critical_store is inserted after the actual store (TxWrite) so that the value is only updated if the transaction is not rolled back by the STM implementation. It is by mechanisms similar to that illustrated that CM may be used to provide additional atomicity and security when used in conjunction with STM implementations.

Two other mechanisms are illustrative, but should not be considered restrictive, of CM integration with STM. When a transaction is rolled back by STM, values of variables modified within the transaction are restored to their original values. The restoration of the values by STM are made visible to CM by use of the promote operation. By promote, the values as restored by STM are made the values recognized by CM and maintained consistently by CM.

When a transaction is committed by STM, values written within a transaction are written to a permanent state and contents of memory locations are updated with these values. By calling an CM call-back function within STM, just before the STM transaction commit, which performs a critical_load operation on every value that is written to the permanent state, then the value written to the permanent state is correct and consistent by ensuring that the value is that written by the last critical_store.

Implementation of a Runtime Protection System

A runtime protection system (RPS) for the protection of critical heap data is one example embodiment of a runtime system which implements a particular instance of CM for heap-allocated objects and is described here. This example embodiment provides custom memory allocation routines for managing critical data in a software application.

Using a Runtime Protection System in an Application

A determination may be made as to which application data is to be considered as critical. The information concerning which data is critical may then be communicated to the runtime system which may allocate critical data using a function, for example, critical_malloc as will be further explained, below. When an application is done with the data, then a routine, for example, critical_free may be called to free the memory which had been allocated with critical_malloc.

RPS may also provide defined operations to allow the application developer to identify critical_loads and critical_stores in the program. The programmer may then use the defined operations to ensure that all critical stores to critical data in the program are conveyed to the RPS system using the RPS routine critical_store( ). Similarly, critical loads from critical data may be marked with the RPS operation critical_load( ), in order to ensure the consistency of the data that is loaded.

d) Original Code without CM Runtime Protection System

```
Node* list_insert(Node* head, Data* d) {
    // ignores the case where head == NULL
    Node* newNode = (Node*) malloc(sizeof(Node));
    newNode->data = d;
    newNode->next = head;
    head = newNode;
    return head;
}
void list_process(Node* head ) {
    Node* current = head;
    while (current != NULL) {
        Data *d = list->data;
        doProcessing(d);
        current = current->next;
    }
}
``` e) Code Employing CM Runtime Protection System

```
Node* list_insert(Node* head, Data * d)
{
    Node* newNode = (Node*) critical_malloc( sizeof(Node) );
    critical_store(&newNode->data, sizeof(newNode->data),
        &d);
    newNode->data = d;
    critical_store(&newNode->next,sizeof(newNode->next),
        &head);
    newNode->next = head;
    head = newNode;
    return head;
}
void list_process(Node* head) {
    Node* current = head;
    while (current != NULL) {
        critical_load(&current->data,
            sizeof(current->data) );
        Data* d = current->data;
        doProcessing(d);
        critical_load(&current->next,
            sizeof(current->next) );
        current = current->next;
    }
}
```

The above listed code examples (which are written using a C-like pseudo code) illustrates an example of using RPS within an example of typical computer programming code. In this example application, patients enter and leave a system at various times and patient-data is stored in elements of a linked list. Each node of the list contains a pointer to a patient record and a pointer to the next node on the list. In this example, the linked list nodes have been determined to be critical data, because if a node on the list were to be corrupted, then it would be possible for the entire list data-structure to be lost. The above example use of RPS, by design, does not protect each individual patient's data from corruption because that data has not been determined to be critical, but the data necessary for protecting the list structure has been marked as critical and RPS has been used to more likely ensure its integrity. The determination of which data is critical and protecting a subset of all data having been determined to be critical is one, among others, of the utilities of the RPS/CM innovation.

The RPS System may also be provided via an API in an operating system or within a development tools environment, for example, to allow application developers to identify critical data, allocate critical memory, and to perform critical loads and critical stores. Such an API may contain, for example, function calls such as (but not limited to) critical_malloc( ), critical_store( ), and critical_load( ).

Management of an RPS Heap

In one particular embodiment, RPS may use replication and redundancy to achieve the requirements of CM. RPS may use a smart memory manager for implementing heap allocation and deallocation operations and for efficiently implementing the additional critical_load and critical_store operations. In one particular embodiment, in addition to the main object which has been marked as critical, RPS maintains two copies of every object that is allocated on the heap. The copies are called shadow copies and mirror the contents of the original object. When a critical_store is done on the object, the shadow copies are updated with the contents being stored in the main object. When a critical_load is done on the object, the object and the data it contains is compared to its shadow copies and the data they contain to ensure that the data is consistent. If there is disagreement between the main object and one or both of the shadow copies, then the object and its shadow copies are made consistent—i.e., repaired—using simple majority voting on their contents. Note that, although two redundant copies, in addition to the main copy, are discussed in this particular example, any number of copies may be used in other embodiments in keeping with the spirit of the invention.

Figure 2:
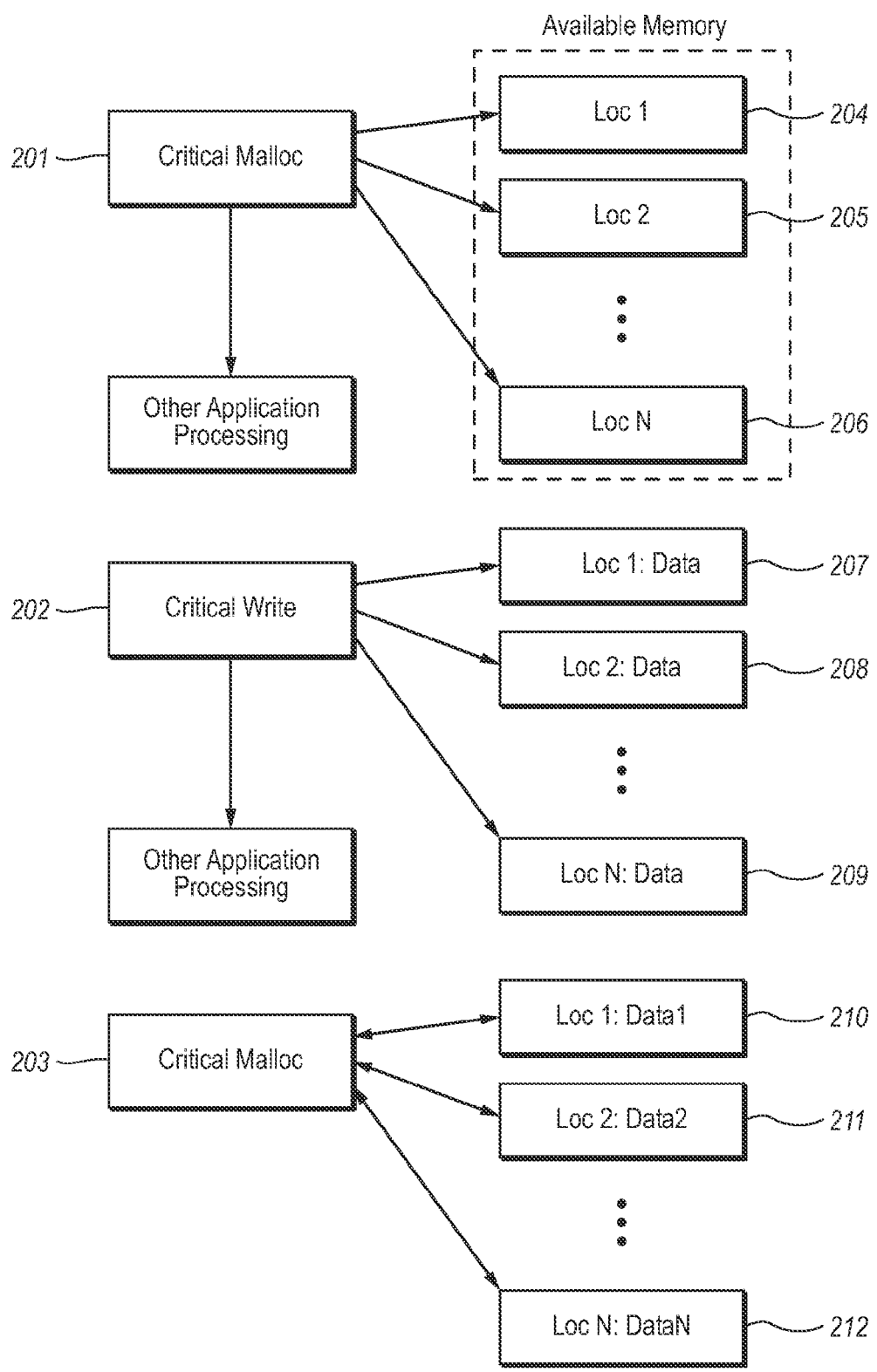
FIG. 2 illustrates typical flow in an application program allocating memory, writing data, and subsequently reading data.

For instance, in FIG. 2, memory is allocated 201 in multiple redundant locations 204, 205, & 206 within the available memory. Sometime later in processing, data may be written to the allocated locations by a critical write 202 such that the redundant locations each have a consistent copy of the data 207, 208, & 209. When the data is then later read by a critical read 203, each copy of the data 210, 211, through 212 may be read and each copy—data1 210, data2 211, through dataN 212—may then be compared for consistency (to detect corruption or inadvertent changes). In a typical embodiment, there may be three redundant locations such that "N" (in 212) would be three.

Figure 3:
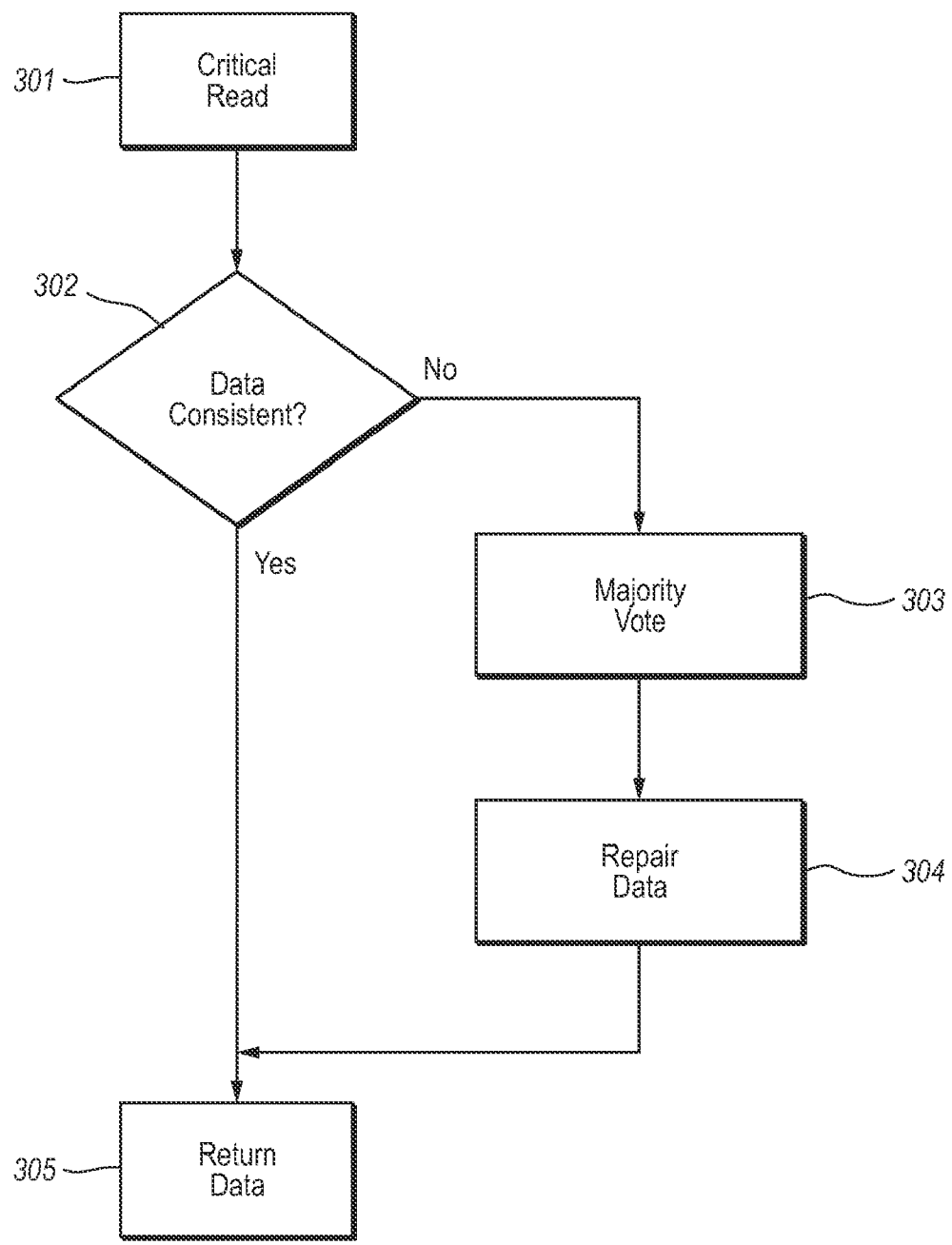
FIG. 3 illustrates typical flow for a protected read of data.

Referring to FIG. 3, after the data has been read 301, the redundant copies of the data may be checked for consistency 302. If the data is not consistent, then majority voting 303 may be employed to resolve the inconsistency. Once the inconsistency has been resolved, then the data can be repaired 304 and the critical read can return 305 the proper data.

In one particular embodiment, RPS allocates all critical data in the program using RPS critical memory allocation routines. For every critical object allocated, an RPS memory manager may then transparently allocate two shadow objects on the heap. The shadow objects and the main object are, optionally, allocated in different, preferably random, physical or logical areas of memory in order to minimize the danger of all copies being similarly corrupted by a single event. The shadow object addresses may then be stored as part of the heap metadata of the original object so that a write of the original object can follow the pointers in the metadata to the shadow copies and update the shadow copies with the data being written to the primary object. Similarly, by following the shadow object pointers, a critical read or critical load of the original object is enabled to follow the pointers to the shadow copies and compare the shadow copies with the contents being read or loaded. Table 4, below, shows examples of some fields of the metadata stored with an RPS object in one particular embodiment.

TABLE 4

Fields of Object Metadata

| Name of Field | Type (Size) | Purpose |
| --- | --- | --- |
| Valid_Field | 2 bytes | Holds a flag to indicate valid heap objects |
| Shadow_Pointer_1 | 4 bytes | Holds address of shadow 1 |
| Shadow_Pointer_2 | 4 bytes | Holds address of shadow 2 |
| Size | 4 bytes | Holds exact size of object |
| Checksum | 2 bytes | checksum of shadow Shadow_Pointer_1, Shadow_Pointer_2, and size fields |

In one example, in order to update or compare the shadow objects, the object metadata is accessed during every reference to the object. The object metadata is stored at the beginning of the main object and may be retrieved given the base address of the object. Hence, a fast mechanism to retrieve the base address of the object given an internal pointer to it would be advantageous. This may be provided by the RPS heap, which is organized, as is understood by those with ordinary skill in the art, using a big bag of pages (BIBOP) style. By doing this, objects of the same size (rounded to the nearest power of two) are grouped together in a contiguous heap region. Such a heap organization, as in this example, is understood by those with ordinary skill in the art to be advantageously used in certain instances for reducing internal fragmentation of a heap. RPS may use this technique for improved metadata lookups.

Consider an internal pointer Ptr to an object. Since the heap may be partitioned into fixed-size contiguous regions by object size, the size of an object may be determined given an internal pointer to the object. In such a case, the size may be 8 bytes. The variable Start_8 may represent the starting address of the heap region containing objects of size 8. The integer division of (Ptr-Start_8) by 8 may then yield the index of the object in the region containing objects of size 8. The index multiplied by the object size, namely 8, corresponds to the starting address of the object pointed to by Ptr. Note that object sizes are rounded to powers of two, and hence, the multiplication and division operations on the size may be performed efficiently using bit-shift operations.

RPS may allocate objects and their shadow copies randomly in the heap using allocation routines similar to routines known by those with ordinary skill in the art as DieHard routines. This may be done to ensure that the probability of a random store to the heap corrupting both the object and its shadows is very small. The object metadata may also contain a valid field to contain a special bit pattern if the object is valid. Such a technique may be useful to prevent wild pointer accesses through critical loads and stores to invalid objects on the heap. RPS may also check that critical stores to critical data do not exceed the bounds of a critical object. This may be accomplished by storing the actual size of the object allocated (not the rounded-up size) as part of the object metadata, and checking the access at runtime to ensure that it is within allowable bounds. The metadata for every object on the heap may be protected with checksums to prevent it from corruption. In addition, a redundant copy of the metadata may be stored in a separate hash table in a protected heap region, which can then be used to restore the metadata in case it is corrupted. The hash table, as known by those with ordinary skill in the art, may be protected using page-level mechanisms.

f) Example of Critical_Malloc Implementation

```
void* critical_malloc(size_t size) {
    // Allocate object and its shadows with DieHard
    ptr = DieHard_malloc( size + metadataSize );
    shadow1 = DieHard_malloc( size );
    shadow2 = DieHard_malloc( size );
    // Initialize metadata of the object
    ((metadata*)ptr)->shadow1 = shadow1;
    ((metadata*)ptr)->shadow2 = shadow2;
    ((metadata*)ptr)->size = size;
    ((metadata*)ptr)->valid = validFlag;
    ((metadata*)ptr)->checksum= computeChecksum(ptr);
    addToHashTable(ptr, shadow1, shadow2, size);
    return ptr + metadataSize;
}
``` g) Example of Critical_Free Implementation

```
void critical_free( void* ptr ) {
    // Retrieve and remove the ptr from the hash table
    (shadow1, shadow2, size) = retrieveRemoveHashTable(ptr)
    // Reset the metadata corresponding to the object
    ((metadata*)ptr->valid = invalidFlag;
```

-continued

```
    // Free the pointer and its shadows
    DieHard_free( ptr );
    DieHard_free(shadow1);
    DieHard_free(shadow2);
}
```

Example code, written using a C-like pseudo-code, for example implementations of the critical_malloc( ) and critical_free( ) operations are shown in code samples "f" and "g," above. The RPS runtime operations critical_load( ) and critical_store( ) may be responsible for comparing and updating the shadow copies of the object in RPS. In this example, in order to update or compare the shadow copies, the pointer to the shadow copies for that object must first be retrieved. It may be noted that the pointers, themselves, may be corrupted. In this case, the pointers could be checked and restored from the hash table. This may be done by a getShadowAddresses( ) function, which, given a pointer inside an object, would retrieve the corresponding locations inside the shadow copies of the object.

For instance, in FIG. 2 a Critical Malloc 201 allocates memory from the available memory and allocates redundant locations 204, 205, & 206 for the subsequent storage of data.

The pseudocode of the getShadowAddresses function is shown in code sample "h," below. It uses a getBaseAddress function, which, given a pointer to an object, returns its base address as was explained before. It may be that in the getShadowAddresses function, a hash table is accessed only when the metadata is invalid or if the checksum may be incorrect. Otherwise, the offsets within the shadows may be computed from the metadata itself, which is typically a much faster operation. The critical_load and critical_store functions, in this example, would return immediately if called on a pointer that was not allocated with critical_malloc (because a normal malloc would not have reserved memory for the shadow copies).

h) Example of Implementation of getShadowAddresses

```
pair getShadowAddresses(void* ptr, int numBytes) {
    void* base = getBaseAddress(ptr);
    metadata* meta = (metadata*)base;
    // Check if the object is a valid one
    if ( meta->valid != validFlag) {
        // Check if the object was allocated
        if (! isAllocated(base) ) return NULL, NULL;
        meta->valid = vaildFlag;
    }
    // Check if the checksum of the metadata matches
    if ( computeChecksum(meta) != meta->checksum ) {
        // Reload the uncorrupted version from hash table
        (shadow1, shadow2, size) = retrieveHashTable(ptr);
        // Update the metadata with shadow1, shadow2, size
        ...
    }
    // At this point, the meta data is correct
    // Check the bounds of the access here
    if (ptr+numBytes >= base+metadataSize+meta->size)
        return (NULL, NULL);
    // Compute the offset of the access from the base ptr
    offset = ptr - (base + metadataSize);
    // Return the corresponding offsets within the shadows
    return meta->shadow1+offset, meta->shadow2+offset;
}
```

Optimization of Error Detection within RPS

In some embodiments, there may be optimizations possible which may speed up critical loads and reduce the necessary computational resources. In some instances, loads may be the more numerous operations an application. One optimization may be possible based on the observation that it is sufficient to compare an original object with only one of the shadow copies during a critical_load in order to detect an error. After comparing only one shadow copy, if there is a mismatch, the second shadow copy may be used to determine which data is in error and to repair the error by using a majority voting scheme. It should be noted that if a second shadow copy is never checked, it may potentially accumulate errors over a period of time, and when a mismatch between an object and its first shadow copy is detected, the second shadow copy may also have been corrupted, making repair impossible. A solution to this problem may be effected by periodically switching the pointers to the shadow copies and checking only with the first shadow copy. This design would allow for both shadows to be checked periodically and would prevent accumulation of errors in any one particular shadow copy.

Figure 4:
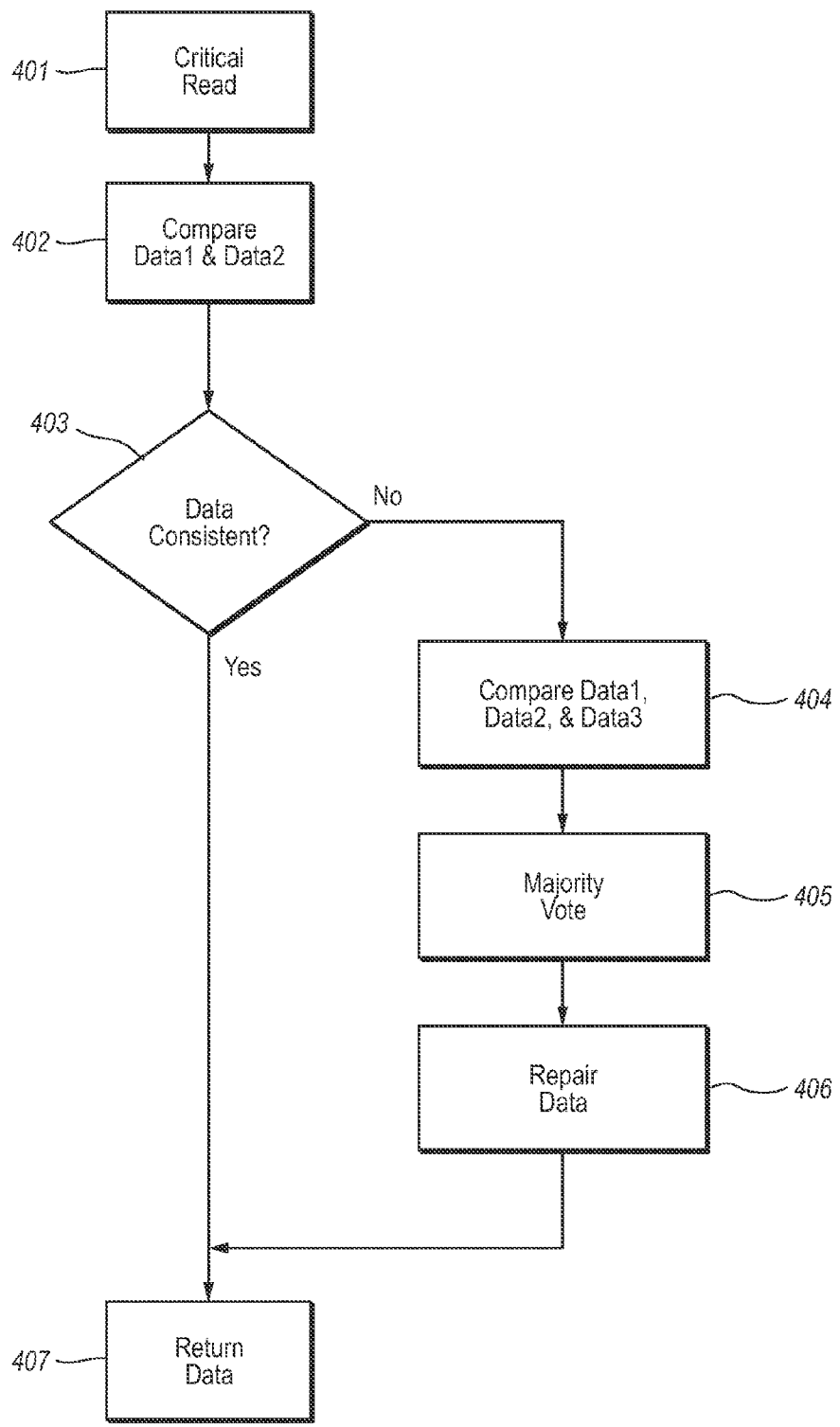
FIG. 4 illustrates the typical flow for a protected read of data employing an optimization scheme.

For instance, in FIG. 4, a Critical Read 401 reads data having previously been stored in redundant memory locations 207, 208, & 209. The data is then checked for consistency 402 but only in the first two locations 210 & 211, not checking another redundant location unless an inconsistency is found. Only if the data is inconsistent between the first two would additional data be compared 404 and majority voting takes place 405. After the majority vote 405, then the data could be repaired 406 based upon the outcome of the vote 405 and then the proper data returned 407.

Another optimization possible would be to maintain a one-element cache for the metadata of the last-accessed object. As many applications have repeated consecutive accesses to the same object, this would reduce the time necessary to service the repeated accesses. Large caches may make the cost of a cache-miss higher as the entire cache needs to be searched on every access. It may be found that a single element cache significantly improves performance and that larger caches may actually degrade performance.

Strategy for Repair in the Runtime Protection System

When a critical_load detects a mismatch between the contents of an object being loaded and the contents of its shadow copy(ies), RPS may launch a repair routine to facilitate correcting the error. One implementation of the repair routine would be to compare the entire object with the shadow copies and use majority voting to find the replica that is in error. However, it may be the case that all objects have errors in them and none of them entirely agree with each other. It is important to note that some parts of an object or shadow copy may still be correct even when the copy, itself, as a whole, is in error. These smaller parts of objects may agree with their counterparts in another copy and may be used to repair the damage (if any) in the third replica. So even if none of the replicas agree with each other when taken as a whole, it may be possible to perform majority voting on a field-level, byte-level, bit-level, or other subset-level basis and facilitate repair of the discovered errors. Because it may be wasteful of computational resources if there is actually only one error in the replicas, faster object-level voting may suffice and may preferably be employed unless object level voting fails and subset-level comparison and voting is determined to be necessary.

In general, it may be preferable to perform majority voting on a coarse granularity and switch to finer granularities only if the coarser-grained voting fails. A strategy which may be implemented in one embodiment would be to perform the voting first at the granularity of the entire object, and, if this fails, employ an exponential back-off strategy to reduce the size of the chunk on which the voting is performed. In the worst-case, this strategy would degrade to a single-byte voting strategy. In the case that multiple replicas have errors in the same byte, then the voting may fail even at the single-byte level, and the repair would fail, be reported as impossible, be aborted, or proceed into further processing as directed by the system or application.

RPS is a particular embodiment aimed to follow CM semantics. Additional operations may be included to handle a case where multiple replica copies are corrupted in exactly the same way (by, for instance, a random or malicious error). RPS, by its design, lessens the probability of this possibility by randomly distributing the replicas on the heap. The protection provided by RPS is probabilistic (in that it makes errors less likely and facilitates repair, but cannot absolutely guarantee error free storage). In the above example, RPS does not recover when the hash table storing the metadata values or the allocation bitmap is corrupted. But, as may be appreciated by those with ordinary skill in the art, a similar embodiment directed toward the metadata and heap information may provide similar protection to that data. Also as can be appreciated, such data may also be protected by page-level mechanisms.

SUMMARY

This paper has described RPS, a data-centric runtime protection system used for improving the reliability of type unsafe programs (such as C and C++) and other programs needing protection of data determined to be critical data. RPS is based on a new underlying memory model called critical memory (CM), and allows programmers to identify key program data as critical. Only critical stores may modify critical data, preventing arbitrary unsafe stores in a program from corrupting this data. RPS implements critical data using replication, and as a result provides probabilistic correctness. RPS allows programmers to selectively identify and protect key data structures, thus allowing the effort and overhead of using RPS to be tailored to the particular application.

Accordingly, the principles of the present invention provide a mechanism, through a runtime protection system (RPS), for creating, maintaining, and employing critical memory (CM) for protecting critical data and computer memory from corruption by erroneous program stores, hardware memory errors, and inadvertent updates. RPS/CM allows data which is critical to the execution of a program to be protected and consistency of data to be ensured.

As can be appreciated by those with ordinary skill in the art, the present invention may be embodied in specific forms other than or in addition to those described without departing from its spirit or essential characteristics. The described embodiments are to be considered in all aspects only as illustrative but not restrictive. The scope of the invention is, therefore, indicated by the appended claims rather than by the foregoing description. All changes which come within the meaning and range of equivalency of the claims are to be embraced within their scope.

What is claimed is:

1. A method for protecting stored critical data from unintended updates, the method comprising:
    designating a subset of system memory as critical data, the subset of system memory being a proper subset not comprising all system memory;
    providing a store function enabled to store the critical data, wherein, when storing the critical data, the store function storing the critical data in at least three redundant computer memory locations allocated upon a heap within system memory, and
    when having stored the critical data, the store function verifying the successful completion of the store; and
    providing a load function enabled to retrieve the stored critical data,
    wherein the load function is enabled to verify that the critical data, having been stored in the at least three redundant computer memory locations, when retrieved, is compared within at least two of the at least three redundant computer memory locations and it is determined if the data in at least two of the at least three redundant computer memory locations is consistent.

2. A method in accordance with claim 1, wherein data stored by the store function is compatible with existing C and C++ functions and libraries.

3. A method in accordance with claim 1, further comprising:
    When having determined that at least two of the at least three redundant memory locations contain data which is inconsistent, determining which data is correct.

4. A method in accordance with claim 3, wherein determining which data is correct comprises comparing votes of the at least three redundant memory locations.

5. A method in accordance with claim 1 wherein verifying the data is consistent comprises an exponential back-off strategy.

6. A method in accordance with claim 3 wherein verifying the data is consistent comprises field-level, byte-level, or bit-level data.

7. A method of allocating storage and protecting critical data, the method comprising:
    providing an allocation function enabled to allocate computer system memory for the storage of data,
    wherein the allocation designates a subset of system memory as critical data, the subset of system memory being a proper subset not comprising all system memory,
    wherein the allocation function allocates on a heap within system memory at least three redundant memory locations for storing identical copies of the critical data,
    wherein the allocation function identifies the redundant memory locations as critical memory locations for the storage of critical data,
    wherein the allocation function returns the address to a first redundant memory location,
    wherein metadata is stored with the first redundant memory location for locating the other redundant memory locations;
    providing a write function enabled to write data to the allocated redundant computer memory locations, wherein copies of the write data are written to each of the redundant locations; and
    providing a read function enabled to read data from the redundant memory locations wherein reading the data comprising verifying the consistency of the read data within at least two of the redundant memory locations.

8. A method in accordance with claim 7 wherein each of the functions provided are provided by an API.

9. A method in accordance with claim 7 wherein the redundant memory locations are allocated in random locations within the available computer memory.

10. A method in accordance with claim 7 wherein the write function enabled to write data to the allocated redundant computer memory locations writes checksum information in at least one of the computer memory locations.

11. A method in accordance with claim 7 wherein the read function enabled to read data immediately returns upon finding data not written by the function enabled to write data to the allocated redundant computer memory locations.

12. A method in accordance with claim 7 wherein the read function enabled to read data is enabled to repair inconsistent data using an operation comprising majority voting of the redundant memory locations.

13. IN a computer system comprising one or more computer processors and computer-readable storage media, a method for protecting stored critical data from unintended updates, the method comprising:
designating a subset of system memory as critical data, the subset of system memory being a proper subset not comprising all system memory,
storing data using a store function enabled to verify the successful completion of the store;
upon being stored, the critical data being stored in at least three redundant computer memory locations allocated upon a heap within system memory;
retrieving the critical data using a load function enabled to verify that the critical data, having been stored in the at least three redundant computer memory locations, when retrieved, is compares within at least two of the at least three redundant computer memory locations and determined if the data in at least two of the at least redundant computer locations is consistent;
when having been found inconsistent, the inconsistent data, having been stored in the at least three redundant memory locations, being repaired by an operation enabled to determine which of the inconsistent data is correct.

14. A method in accordance with claim 13 wherein verifying the data in the at least three redundant computer memory locations is consistent comprises majority voting of the contents of the at least three redundant computer memory locations.

15. A method in accordance with claim 13 wherein verifying the data in the at least three redundant computer memory locations is consistent comprises comparing two of the at least three redundant computer memory locations.

16. A method in accordance with claim 13 wherein verifying the data in the at least three redundant computer memory locations is consistent further comprises, when finding data within the at least three redundant computer memory locations inconsistent, comparing the at least three redundant computer memory locations with at least an additional redundant computer memory location.

17. A method in accordance with claim 16 wherein repairing the data comprises determining the correct data by majority voting of at least three computer memory locations.

18. A method in accordance with claim 15 wherein the second of the at least three redundant computer memory locations compared is alternated with other memory locations within the at least three redundant computer memory locations.

* * * * *